Patented Nov. 8, 1932

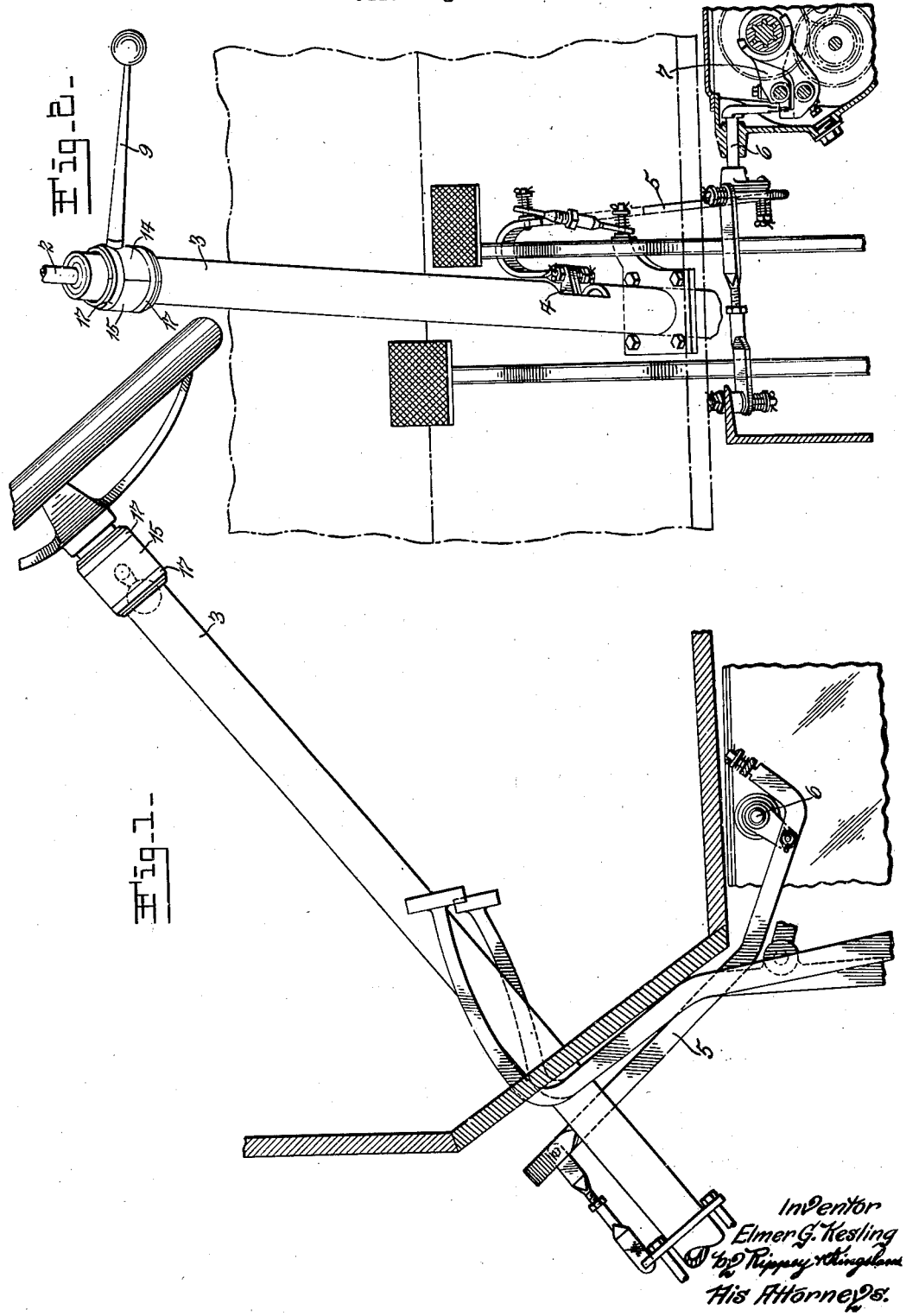

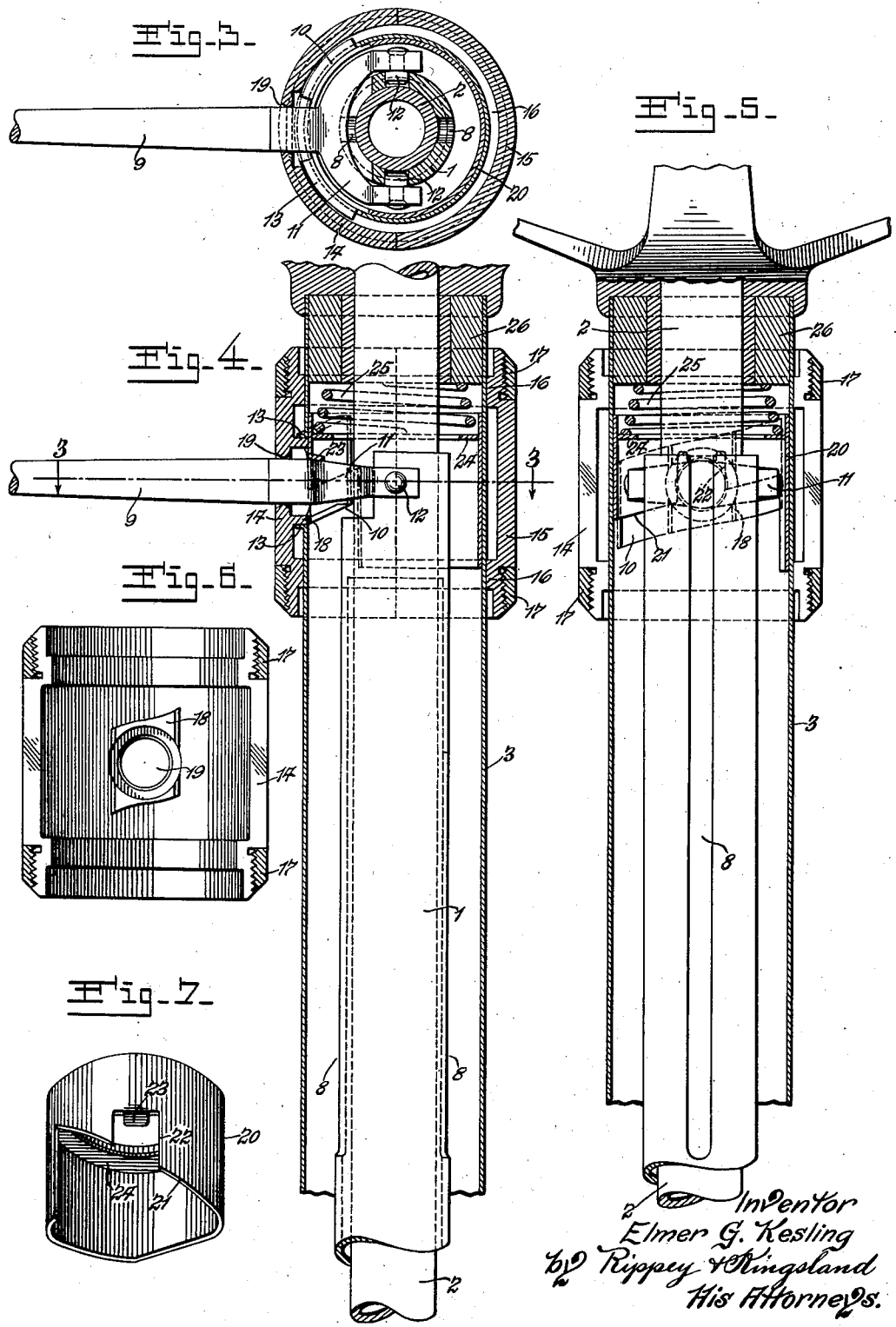

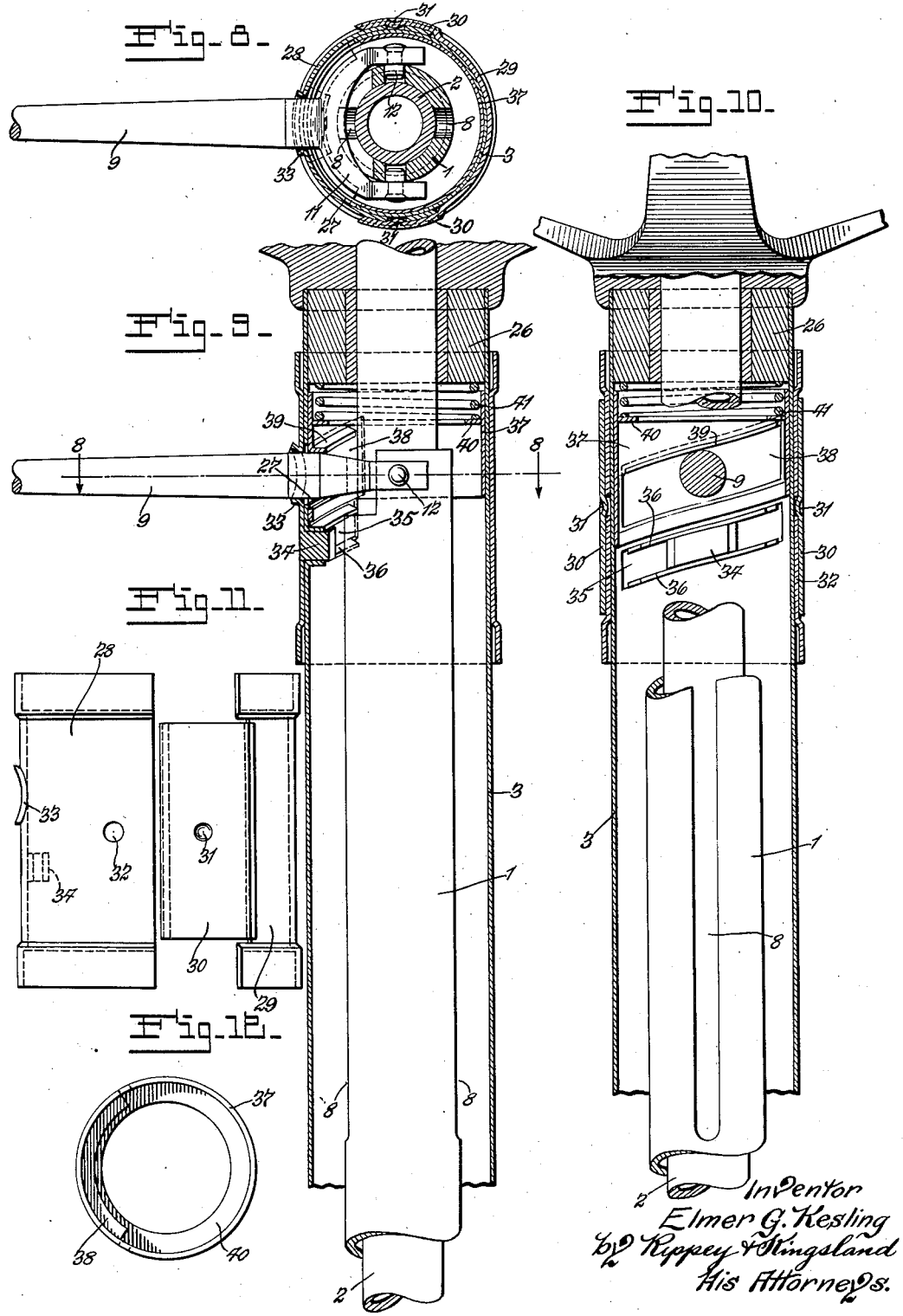

1,886,695

UNITED STATES PATENT OFFICE

ELMER G. KESLING, OF BLOOMFIELD, MISSOURI

SPEED CHANGING MECHANISM

Application filed August 17, 1931. Serial No. 557,492.

This invention relates to speed changing mechanism of the type used in automobiles and other vehicles.

In my prior Patent No. 1,800,837, granted April 14, 1931, there is disclosed a type of speed changing mechanism in which a shaft is supported for rocking and longitudinal movements and has a lever pivoted thereto for imparting said movements to said shaft. Said mechanism comprises a guide for said lever arranged in a plane inclined relative to the axis of the shaft and designed and adapted to function as a fulcrum for the lever. The guide comprises an elongated slot having its opposite walls constituting the fulcrum for the lever. In said patent, the device constituting the lever support and guide is an element separate from and attached to the tubular steering column.

In my prior application for patent for speed changing mechanism, filed March 7, 1931, Serial No. 520,942, there is disclosed a construction and arrangement in which a tubular shaft is mounted for rocking and longitudinal movements within the tubular housing that encloses the steering shaft, the steering shaft extending through the tubular shaft. In the device of said application, the tubular housing is formed with a slot that constitutes a guide for a lever for imparting rocking and longitudinal movements to said tubular shaft, the upper and lower walls of said slot functioning as fulcrums for the lever.

My present invention relates to speed changing mechanisms of the type disclosed in my said patent and application.

Objects of the invention are to provide equipment for substantially closing the inclined guide slot through which the operating lever of the speed changing mechanism extends, so that, irrespective of the position of said lever, the guide slot is substantially closed, thus presenting a more finished and artistic appearance and also preventing the passage of foreign articles and bodies of substantial size through said slot; to provide means whereby said closure for said slot may be moved and operated by the operating lever without presenting any substantial resistance to the operation of said lever; to provide a device for imparting yielding pressure to the lever to prevent undesired oscillation and vibration of the lever during the travel of the vehicle, thus preventing and reducing undesirable noises; and to provide improved means and construction facilitating and expediting the connection of the operating lever with the shaft operated thereby and to an equal extent facilitating and expediting the detachment of said lever from said shaft; and to obtain all other advantages inherent in the improved construction herein disclosed, reference now being made to the accompanying drawings, in which—

Fig. 1 is a side elevation of a speed changing mechanism embodying a preferred form of the present invention.

Fig. 2 is a rear elevation.

Fig. 3 is a cross sectional view approximately on the line 3—3 of Fig. 4 showing the relationship of many of the parts of the present improvement.

Fig. 4 is a longitudinal sectional view of the steering shaft housing and of the closure sleeve for the slot constituting the lever guide.

Fig. 5 is a similar sectional view taken at right angles to the section of Fig. 4.

Fig. 6 is an inner side elevation of one of the sleeve elements.

Fig. 7 is a perspective view of one of the members of the anti-rattler device for preventing vibration and rattling of the operating lever and shaft.

Fig. 8 is a sectional view approximately on the line 8—8 of Fig. 9 showing a variation of the invention.

Figs. 9 and 10 are longitudinal sectional views of the tubular housing for the steering shaft taken at right angles to each other and illustrating different features of this alternative form of the invention.

Fig. 11 is a detached view showing the parts of the closure sleeve for the guide slot.

Fig. 12 is a lower end elevation of one of the members of the anti-rattler device.

The speed changing mechanism in which the present invention is embodied comprises a tubular shaft 1 mounted for longitudinal and turning movements along and about the steering shaft 2 and enclosed within a rigidly mounted tubular housing 3. As disclosed in my said application, Serial No. 520,942, the lower end of the tubular shaft 1 is equipped with a laterally extended crank arm 4 (Fig. 2) having pivotal connection with a link and lever element 5, whereby longitudinal and rocking movements are imparted to a spindle 6 of the speed changing mechanism by operation of the shaft 1. It is known that in order to operate the speed changing mechanism 7 the spindle 6 must first be moved longitudinally inwardly or outwardly to the fullest extent that it is possible to move said spindle before the spindle can be rocked. Further, it is known that after the spindle 6 has been moved longitudinally in either direction to the fullest extent possible, said spindle may be rocked to complete an intended operation of the speed changing gearing.

The connections 4—5 from the tubular shaft 1 to the spindle 6 constitute means for imparting these movements to this spindle 6 by operation of said tubular shaft. After the spindle 6 has been turned in either direction from its starting position, said spindle cannot be moved longitudinally so long as it remains in its turned position, nor until it is turned back to its starting position. Accordingly, these connections 4—5, etc. from the spindle 6 to the shaft 1 prevent the shaft 1 from being moved longitudinally so long as said shaft 1 remains turned from its starting position. These mechanisms prevent longitudinal movement of the shaft 1 in all positions to which said shaft is turned other than the starting position of said shaft.

The upper end of the shaft 1 has a pair of diametrically opposite slots 8. A lever 9 extends through an inclined guide slot 10 in the housing 3 and has on its inner end a bifurcation 11 between the arms of which the split upper end of the shaft 1 is embraced. Pivots 12 connect the arms of the bifurcation 11 with the two opposite portions of the tubular shaft 1, so that by proper manipulation of the lever 9, the shaft 1 may be moved along and turned about the shaft 2. The pivots 12 are received in holes in the spaced portions of the split end of the shaft 1. Before the shaft 2 is extended through the shaft 1, the two spaced portions of the split end of the shaft 1 may be pressed toward each other and extended between the arms of the bifurcation 11 and then be permitted to spread apart until the pivots 12 are engaged in the holes in said shaft 1. Also, when the shaft 2 is removed from the shaft 1, the split ends of said shaft 1 may be pressed together and disengaged from the pivots 12.

The slot 10 is inclined relative to the axis of the shaft 1 and, in one construction shown (Fig. 4), the upper and lower walls of said slot 10 are bent outwardly to provide outwardly extended flanges 13. A sleeve, comprising a member 14 and a cooperating member 15, is mounted on the tubular housing 3. This sleeve is provided with internal ribs 16 arranged to operate against the periphery of the housing 3, leaving the remaining portion of said sleeve out of contact with the periphery of said housing. The upper and lower ends of the sleeve members are circumferentially threaded and nuts 17 are screwed on said threaded portions of said sleeve members, thus holding said sleeve members in assembled relationship for free longitudinal and turning movements along and about the housing 3.

One of these sleeve members is formed with a lug 18 projecting inwardly into the slot 10 and having its upper and lower edges operating against the flanges 13. The lever 9 projects through a hole 19 through said lug, the walls of said hole being appropriately beveled so as to constitute fulcrums for the lever 9.

It is now clear that the lever 9 may be fulcrumed against the walls of the hole 19 in order to move the shaft 1 longitudinally along the shaft 2 in either direction. After the shaft 1 has been moved to the full extent in either direction, the lever 9 may be operated to turn said shaft 1 about the shaft 2. This operation of the lever 9 turns the sleeve 14—15 about the housing 3 and also moves said sleeve longitudinally along said housing because of the inclination of the slot 10 with which said sleeve is connected by the boss 18. This results in the handle of the lever 9 being moved in substantially a horizontally plane toward and away from the operator instead of in an inclined plane parallel with the inclined steering wheel.

The invention also includes an anti-rattler for the lever 9 and shaft 1, whereby said parts are held from vibration and chattering during the travel of the vehicle. A sleeve 20 is mounted in the tubular housing 3 and has an inclined edge 21 approximately parallel with the upper and lower walls of the slot 10. A notch 22 extends upwardly from the edge 21 and the upper wall of said notch has an inwardly extended lip 23. This notch 22 receives the lever 9 and the lip 23 seats against the upper side of said lever. The sleeve 20 is provided with an internal flange 24 somewhat below the upper end of said sleeve and providing a seat for the lower end of the spring 25. The upper end of the spring 25 presses against the bushing 26 secured within the upper end of the housing 3. The power and resiliency of the spring 25 are utilized to press the sleeve 20 downwardly in yielding engagement with the lever 9. This prevents the lever 9 and the shaft 1 from vibrating and chattering during travel of the vehicle. This anti-rattler device does not offer any substantial resistance to the operation of the lever 9 and the parts operated thereby.

In Figs. 8 to 12, inclusive, of the drawings, a variation of certain features of the invention is shown. The variation is in the construction and arrangement of the closure sleeve for the guide slot of the operating lever 9 and in the construction and arrangement of the anti-rattler. Other parts shown in Figs. 8 to 12, inclusive, of the drawings are the same as the parts already described and the same reference characters are applied thereto.

The lever 9 extends through an inclined slot 27 in the housing 3. A pair of sleeve members 28 and 29 are held in cooperative relationship around the housing 3. The sleeve member 29 has resilient arms 30 pressing against the adjacent marginal portions of the sleeve member 28 and formed with detent lugs 31 engaging in holes 32 in said sleeve member 28 effectively to hold said sleeve members together but to permit their detachment, if desired.

The lever 9 projects through a hole in one of these sleeve members, said hole being surrounded by a marginal flange 33 against which the lever 9 fulcrums. One of said sleeve members is also provided with a lug 34 projecting into an inclined slot 35 in the housing 3 formed parallel with the slot 27. The upper and lower walls of the slot 35 are bent inwardly to provide flanges 36 constituting seats against and along which the lug 34 engages and operates.

It is now clear that in this variation of the invention I have provided a sleeve mounted on the tubular housing 3 and constructed and arranged to function as a fulcrum for the lever 9 and to cooperate with the housing 3 to guide said lever in certain of its movements. This construction causes the handle of the lever 9 to move approximately in a horizontal plane toward and away from the operator when said lever is operated to turn the shaft 1.

The anti-rattler device for the lever 9 and the shaft 1 comprises a sleeve 37 mounted in the housing 3 and provided with an inclined slot 38 opposite the slot 27. The upper wall of the slot 38 is bent inwardly to provide a flange 39 that seats and presses against the lever 9. The sleeve 37 has an internal flange 40 constituting a seat for the lower end of a spring 41, the upper end of which bears against the bushing 26 secured in the upper end of the housing 3. Power and energy of this spring 41 are utilized to press the anti-rattler device into yielding engagement with the lever 9 effectively to prevent vibration and chattering of said lever 9 and the shaft 1 when the vehicle is in motion.

The foregoing description of the invention and its construction includes a sufficient description of the mode of operation and the functions and results obtained. It is clear enough that the invention obtains all of its intended objects and purposes in a highly efficient and satisfactory way and that the construction and arrangement of the parts may be varied within the scope of equivalent limits and otherwise than as herein specifically described without departure from the nature and principle of the invention. I do not restrict myself in any unessential particulars but what I claim and desire to secure by Letters Patent is:

1. In speed changing mechanism, a shaft supported for longitudinal and turning movements, a lever pivoted to said shaft for imparting said longitudinal and turning movements to said shaft, a support, and a fulcrum for and having pivotal connection with said lever mounted for longitudinal and turning movements on said support and being moved with said lever and also being moved longitudinally when said lever is operated to turn said shaft.

2. In speed changing mechanism, a shaft supported for longitudinal and turning movements, a lever for imparting said longitudinal and turning movements to said shaft, a support, a fulcrum for said lever mounted on said support and being turned about said support by said lever when said lever is operated to turn said shaft, and means for moving said fulcrum longitudinally along said support when said fulcrum is turned by said lever.

3. In speed changing mechanism, a shaft supported for longitudinal and turning movements, a lever for imparting said longitudinal and turning movements to said shaft, a fulcrum for and having pivotal connection with said lever, and means for moving said fulcrum longitudinally with respect to said shaft when said lever is operated to turn said shaft.

4. In speed changing mechanism, a shaft supported for longitudinal and turning movements, a lever for imparting said longitudinal and turning movements to said shaft, a fulcrum for said lever, means for moving said fulcrum longitudinally with respect to said shaft when said lever is operated to turn said shaft, and mechanism for preventing turning movement of said shaft by said lever until said shaft has been moved longitudinally by said lever.

5. In speed changing mechanism, a shaft supported for longitudinal and turning movements, a lever for imparting said longitudinal and turning movements to said shaft, a fulcrum against which said lever pivotally operates to move said shaft longitudinally, and means for moving said fulcrum longitudinally when said shaft is operated to turn said lever.

6. In speed changing mechanism, a shaft supported for longitudinal and turning movements, a lever pivoted to and projecting laterally from said shaft for imparting said longitudinal and turning movements to said shaft, and a movable fulcrum for said lever whereby the end of said lever that is away from said shaft is caused to move in approximately a horizontal direction toward and away from the operator when said lever is operated to turn said shaft.

7. In speed changing mechanism, a shaft supported for longitudinal and turning movements, a lever for imparting said longitudinal and turning movements to said shaft, a housing enclosing said shaft and having an inclined slot through which said lever extends for operation, a movable fulcrum for said lever mounted on said housing, and means for controlling said fulcrum to cause the outer end of said lever to move approximately in a horizontal direction toward and away from the operator when said lever is operated to turn said shaft.

8. In speed changing mechanism, a shaft supported for longitudinal and turning movements, a lever for imparting said longitudinal and turning movements to said shaft, a housing enclosing said shaft and having a slot through which said lever extends for operation, a movable fulcrum for said lever mounted on said housing, and means enclosed in said housing and engaging and cooperating with said lever to diminish vibration of said lever and said shaft.

9. In speed changing mechanism, a shaft supported for longitudinal and turning movements, a lever for imparting said longitudinal and turning movements to said shaft, a housing enclosing said shaft and having a slot through which said lever extends for operation, a fulcrum device for and movable by said lever supported by said housing and substantially closing said slot in any of the positions of said lever, and means for moving said fulcrum device spirally about said housing when said fulcrum device is moved by said lever.

10. In speed changing mechanism, a shaft supported for longitudinal and turning movements, a lever for imparting said longitudinal and turning movements to said shaft, a housing having an opening through which said lever extends for operation, a movable fulcrum device for said lever, and means for supporting said fulcrum device in connection with said housing permitting operation of said lever to turn said shaft and said fulcrum device and moving said fulcrum device longitudinally when said lever is operated to turn said shaft.

11. In speed changing mechanism, a shaft supported for longitudinal and turning movements, a lever for imparting said longitudinal and turning movements to said shaft, a housing having an opening through which said lever extends for operation, a movable fulcrum device for said lever, means for supporting said fulcrum device in connection with said housing permitting operation of said lever to turn said shaft and fulcruming said lever when said lever is operated to move said shaft longitudinally, and a device enclosed in said housing and cooperating with said lever to diminish vibration of said lever and said shaft.

12. In speed changing mechanism, a shaft supported for longitudinal and turning movements, a lever for imparting said longitudinal and turning movements to said shaft, a housing enclosing said shaft and having an opening through which said lever extends for operation, a fulcrum for said lever mounted on said housing and substantially closing said opening in any of the positions of said lever, means supporting said fulcrum in connection with said housing and imparting longitudinal movements to said fulcrum when said lever is operated to turn said shaft, and a device mounted in said housing diminishing vibration of said fulcrum and said lever and said shaft in any of the operated positions of said shaft.

13. In speed changing mechanism, a shaft supported for longitudinal and turning movements, a lever for imparting said longitudinal and turning movements to said shaft, a sleeve device having an opening through which said lever extends and fulcrums, and means for supporting and preventing longitudinal movements of said fulcrum device when said lever is operated to move said shaft longitudinally and for moving said fulcrum device longitudinally when said lever is operated to turn said shaft.

14. In speed changing mechanism, a shaft supported for longitudinal and turning movements, a lever for imparting said longitudinal and turning movements to said shaft, a sleeve device having an opening through which said lever extends and fulcrums, means for supporting and preventing longitudinal movements of said fulcrum device when said lever is operated to move said shaft longitudinally and for moving said fulcrum device longitudinally when said lever is operated to turn said shaft, and an anti-rattler mechanism diminishing vibration of said lever and said shaft and said fulcrum device in any of the positions of said lever.

15. In speed changing mechanism, a shaft supported for longitudinal and turning movements, a lever for imparting said longitudinal and turning movements to said shaft, a housing in which said shaft is enclosed and having an opening through which said lever extends, a number of detachable members forming a sleeve around said shaft, means for holding said detachable members in cooperative relationship for longitudinal and turning movements about said housing, means for fulcruming said lever on one of said members, and guiding means for said sleeve permitting movement of said lever to turn said shaft and move said sleeve longitudinally when said sleeve is turned by said lever.

16. In speed changing mechanism, a shaft supported for longitudinal and turning movements, a lever for imparting said longitudinal and turning movements to said shaft, a housing in which said shaft is enclosed and having an opening through which said lever extends, a number of detachable members forming a sleeve around said shaft, means for holding said detachable members in cooperative relationship for longitudinal and turning movements about said housing, means for fulcruming said lever on one of said members, guiding means for said sleeve permitting movement of said lever to turn said shaft and move said sleeve longitudinally when said sleeve is turned by said lever, and mechanism mounted in said housing substantially diminishing vibration of said lever and said shaft and said sleeve in any of the positions thereof.

17. In speed changing mechanism, a shaft supported for longitudinal and turning movements, a lever for imparting said longitudinal and turning movements to said shaft, a fulcrum for said lever, and means for supporting said fulcrum against longitudinal movement when said lever is operated to move said shaft longitudinally and for guiding said fulcrum in a spiral turning movement when said lever is operated to turn said shaft.

18. In speed changing mechanism, a shaft supported for longitudinal and turning movements, a lever for imparting said longitudinal and turning movements to said shaft, a fulcrum for said lever, means for supporting said fulcrum against longitudinal movement when said lever is operated to move said shaft longitudinally and for guiding said fulcrum in a spiral turning movement when said lever is operated to turn said shaft, and mechanism substantially diminishing vibration of said lever and said fulcrum and said shaft in any of the positions thereof.

19. In speed changing mechanism, a shaft supported for longitudinal and turning movements, a lever for imparting said longitudinal and turning movements to said shaft, a fulcrum for said lever, and a support for said fulcrum preventing longitudinal movement of said fulcrum when said lever is operated to move said shaft longitudinally and moving said fulcrum longitudinally when said lever is operated to turn said shaft.

20. In speed changing mechanism, a shaft supported for longitudinal and turning movements, a lever for imparting said longitudinal and turning movements to said shaft, a fulcrum for said lever, a support for said fulcrum preventing longitudinal movement of said fulcrum when said lever is operated to move said shaft longitudinally and moving said fulcrum longitudinally when said lever is operated to turn said shaft, and mechanism cooperating with said lever to diminish vibration of said lever and said fulcrum and said shaft in any of the positions thereof.

21. In speed changing mechanism, a shaft supported for longitudinal and turning movements and having spaced portions on one end bendable toward each other, a lever, a bifurcation on said lever embracing said portions between the arms thereof, pivots connecting said bifurcation with said spaced portions of said shaft, and fulcrum and guide devices for said lever whereby said lever may be operated to impart longitudinal and turning movements to said shaft.

22. In speed changing mechanism, a lever having spaced arms on one end, pivots in connection with said arms, a shaft having spaced portions at one end extending between said spaced arms of said lever and engaging said pivots and being bendable toward each other out of engagement with said pivots, and fulcrum mechanism for said lever whereby said lever may be operated to impart longitudinal and turning movements to said shaft.

23. In speed changing mechanism, a shaft supported for longitudinal and turning movements, a lever for imparting said longitudinal and turning movements to said shaft, and fulcrum mechanism for and having pivotal connection with said lever supported for longitudinal and turning movements and being movable longitudinally by said lever only when said lever is operated to turn said shaft.

24. In speed changing mechanism, a shaft supported for longitudinal and turning movements, a lever for imparting said longitudinal and turning movements to said shaft, fulcrum mechanism for said lever supported for longitudinal and turning movements and being movable by said lever only when said lever is operated to turn said shaft, and means for moving said fulcrum mechanism longitudinally when said fulcrum is operated by said lever.

25. In speed changing mechanism, a shaft supported for longitudinal and turning movements and having spaced portions on one end bendable toward each other, a lever, a bifurcation on said lever embracing said portions between the arms thereof, pivots connecting said bifurcation with said spaced portions of said shaft, means preventing said spaced portions of said shaft from bending toward each other, and fulcrum and guide devices for said lever whereby said lever may be operated to impart longitudinal and turning movements to said shaft.

26. In speed changing mechanism, a lever having spaced arms on one end, pivots in connection with said arms, a tubular shaft having spaced portions at one end extending between said arms of said lever and engaging said pivots and being bendable toward each other out of engagement with said pivots, a shaft extending through said tubular shaft and preventing said spaced portions from bending toward each other out of engagement with said pivots, and fulcrum mechanism for said lever whereby said lever may be operated to impart longitudinal and turning movements to said tubular shaft.

27. In speed changing mechanism, a tubular shaft supported for longitudinal and turning movements and having a split end, a lever having one end pivoted to said split end of said tubular shaft, a shaft extending through said tubular shaft and preventing said split end of said tubular shaft from becoming disengaged from said lever, and fulcrum mechanism for said lever whereby said lever may be operated to impart longitudinal and turning movements to said tubular shaft.

28. In speed changing mechanism, a tubular shaft having spaced extensions at one end adapted to be bent toward each other, a bifurcated lever pivoted to said spaced extensions, a fulcrum for said lever, and a shaft extending through said tubular shaft and preventing said spaced extensions from being bent out of engagement with said lever.

29. In speed changing mechanism, a tubular shaft having spaced extensions at one end, a lever for imparting longitudinal and turning movements to said shaft, pivots connecting said lever with said spaced extensions, a shaft extending through said tubular shaft and preventing said spaced extensions from becoming disengaged from said lever, and fulcrum mechanism for said lever supported for turning movements by said lever.

30. In speed changing mechanism, a tubular shaft having spaced extensions at one end, a lever for imparting longitudinal and turning movements to said shaft, pivots connecting said lever with said spaced extensions, a shaft extending through said tubular shaft and preventing said spaced extensions from becoming disengaged from said lever, fulcrum mechanism for said lever supported for turning movements by said lever, and means for moving said fulcrum mechanism spirally when said fulcrum mechanism is turned by said lever.

ELMER G. KESLING.